H. F. HOFFMAN.
DIRIGIBLE HEADLIGHT.
APPLICATION FILED FEB. 15, 1916.
1,212,769.
Patented Jan. 16, 1917.
2 SHEETS—SHEET 1.
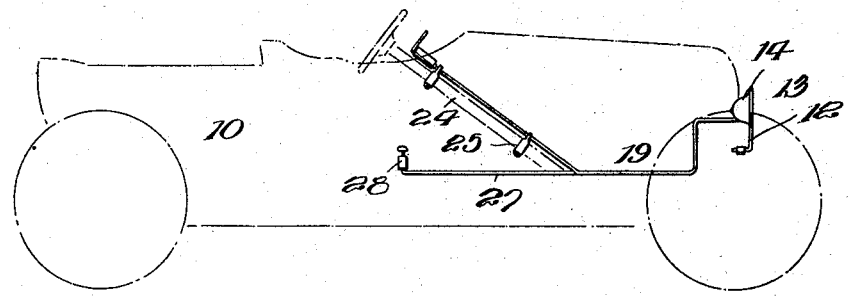
Fig. 1.
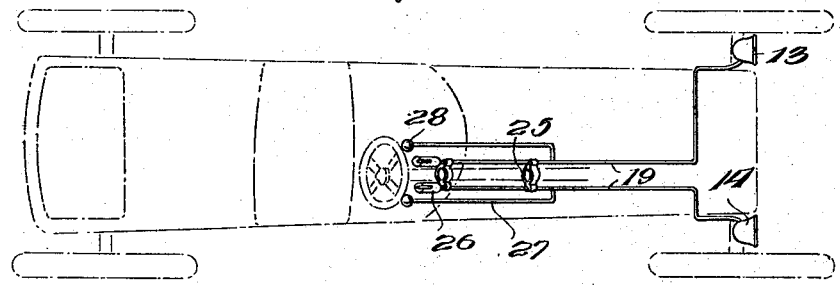
Fig. 2.
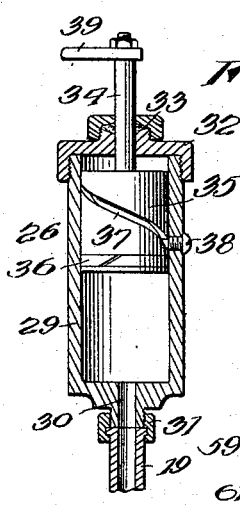
Fig. 7.
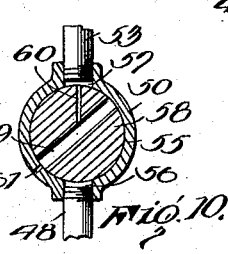
Fig. 8.
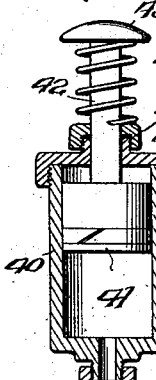
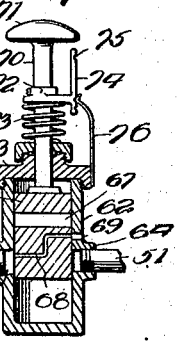
Fig. 11.
Fig. 10.
Inventor
H. F. Hoffman
By
[signature], Attorneys.

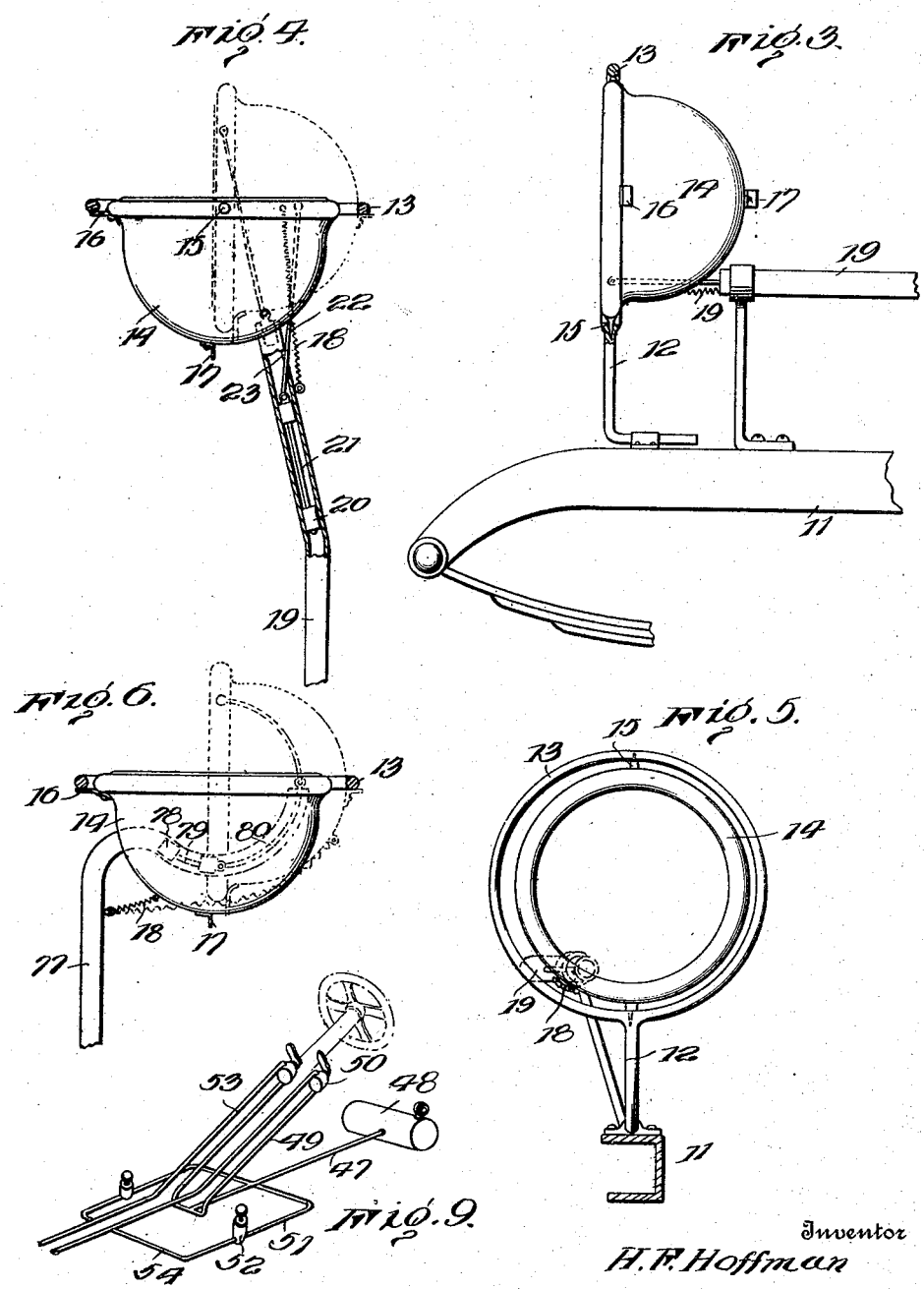

UNITED STATES PATENT OFFICE.

HARRY F. HOFFMAN, OF ALLENTOWN, PENNSYLVANIA.

DIRIGIBLE HEADLIGHT.

1,212,769.   Specification of Letters Patent.   Patented Jan. 16, 1917.

Application filed February 15, 1916. Serial No. 78,504.

*To all whom it may concern:*

Be it known that I, HARRY F. HOFFMAN, a citizen of the United States, residing at Allentown, in the county of Lehigh and State of Pennsylvania, have invented certain new and useful Improvements in Dirigible Headlights, of which the following is a specification.

My invention relates to new and useful improvements in dirigible headlights for motor vehicles and more particularly to the manner of mounting the headlights for turning movement and in the means for revolving them, as desired.

One of the objects of my present invention consists in the provision of a pair of headlights disposed one at either side of the vehicle and each so mounted that while it normally is directed forwardly along the path of movement of the vehicle it may be swung outwardly to cast its light to the side of the road, the lights each being mounted for swinging movement of ninety degrees about a vertical axis. Because of this manner of mounting the lights, the driver is enabled to illuminate the side of the road when passing other vehicles, thereby avoiding the necessity of using dimmers. Furthermore, he is enabled to light up turns in a road and at crossings one light may be set ahead and the other turned to the side in order to give the driver a clear vision of the intersecting streets. Furthermore, lights so mounted are of assistance in locating houses, sign posts and the like and may be used to indicate the driver's intention to turn in one direction or the other.

A further object of my invention consists in providing means for operating and controlling the lights independently of each other from the driver's seat. I employ fluid pressure means for operating and controlling the lights in which the motive fluid may be either a liquid or a gas, and a still further object of my invention resides in the provision of controlling valves so arranged that either light may be controlled either by hand or foot, as desired.

With these and other objects in view, my invention will be more fully described, illustrated in the accompanying drawings, and then specifically pointed out in the claims which are attached to and form a part of this application. In the drawings, Figure 1 is a side elevation of a conventional form of motor vehicle, showing my dirigible headlights in place; Fig. 2 is a top plan view of the structure shown in Fig. 1; Fig. 3 is a side elevation of one of the headlights, showing the manner of mounting it for turning movement and also the manner in which it is actuated; Fig. 4 is a top plan view, partially in section, of the structure shown in Fig. 3; Fig. 5 is a front elevation of the lamp and its supporting mechanism; Fig. 6 is a view corresponding to Fig. 4, illustrating a modified form of my invention; Fig. 7 is a central vertical sectional view of the hand operated control device employed with my system when a liquid is used as the motive power; Fig. 8 is a corresponding view of the foot operated control device used under the same circumstances; Fig. 9 is a fragmentary perspective view of the controlling system employed when a gas is utilized as the motive fluid; Fig. 10 is a sectional view of the hand operated valve employed with the system shown in Fig. 9; Fig. 11 is a corresponding view of the foot operated valve employed with the system shown in Fig. 9.

Corresponding and like parts are referred to in the following description and indicated in all the views of the drawings by the same reference characters.

In order to insure a clear and accurate understanding of my invention and its operation, I have illustrated it in connection with a conventional form of motor vehicle 10 having side frames 11 to the forward portions of which I secure my headlight supporting brackets 12. Each of these brackets includes a standard portion which is secured to the side frame of the vehicle and a ring-shaped body portion 13 which encircles the light 14. This body portion 13, at opposite sides, is provided with vertically alined sockets to receive trunnions 15 formed upon the light in such a manner that the light is freely supported within the ring for rotation about its vertical axis. Each light, at one side, is provided with an extension or stop 16 which engages the ring 13 when the light is directed ahead to prevent its over swinging inwardly and each light is further provided at its rear with a second extension or stop 17 which engages the ring when the light has been swung outwardly through an angle of ninety degrees to prevent over-rotation in an outward direction. A spring 18, secured to the light at one end and to any suitable fixed body at its other, serves to normally hold the light in its forwardly directed position. Obviously, any other type of spring may be utilized for the same purpose.

Pipes 19 lead from points near the rear of the lights rearwardly to certain controlling devices located conveniently for the driver of the vehicle and pistons are mounted for movement in the free open forward ends of these pipes. Each piston includes spaced piston heads 20 connected by a piston rod 21. A rigid link 22 is pivotally connected to the outermost of these piston heads and to the light in such a manner that reciprocation of the piston in the pipe will cause swinging of the light to which it is connected. As shown in Fig. 4, the pipe adjacent its free end is slotted, as at 23, to permit proper movement of the link 22. Obviously, assuming that the light is directed ahead and held in such position by the spring 18, pressure directed against the piston, either by supplying a gas under pressure to the pipe or by forcing a liquid into the pipe, will cause outward movement of the piston and turning of the light. The light at the right of the vehicle is, of course, arranged to turn outwardly toward the right, while that at the left is arranged to turn in the opposite direction.

The pipes 19 preferably lead through the hood of the vehicle and through the dash and extend upwardly in parallel spaced relation to the steering column 24 of the vehicle, being supported upon the column by suitable brackets 25. Hand operated controlling devices 26 are connected to the upper ends of these pipes, being preferably located immediately below the steering wheel. Pipes 27 branch one from each of the pipes 19 and extend beneath the floor of the car and upwardly through the floor and are connected at their upwardly directed ends to foot operated controlling devices 28.

Each of the hand operated controlling devices 26 includes a cylinder 29 provided at one end with an outlet passage 30 leading through a threaded nipple 31 by means of which it is connected to the pipe 19. The opposite end of the cylinder is closed by a threaded cap 32 which includes in its construction a stuffing box 33 through which projects a rod 34. This rod, at its inner end, is connected to a cylindrical plunger 35 which fits snugly within the bore of the cylinder, being provided adjacent its end with an expansible piston ring 36 to prevent passage of a liquid contained in the pipe 19 and lower end of the cylinder into the upper end thereof upon depression of the plunger. This plunger, above the packing ring, is formed with a helical channel 37 and a screw or pin 38 is passed through the slot of the cylinder and provided with an unthreaded terminal which seats in this channel. It will, therefore, be appreciated that a turning movement of the rod 34 and, consequently, of the plunger will cause a reciprocation of the plunger in the cylinder. A handle 39 is secured to the outer end of the rod 34 as a means for turning it. The pitch of the helical channel 37 and length of the plunger should be such that a quarter turn of the handle will be sufficient to move the plunger substantially from one end of the cylinder to the other and the handles are so set upon the rods 34 as to normally project forwardly beneath the wheel, as clearly shown in Figs. 1 and 2.

The foot operated control devices 28, as best shown in Fig. 8, each include a cylinder 40 which is identical with that shown in Fig. 7 and in which is mounted a plunger 41 having the piston rod 42 projecting through the stuffing box 43 of the cap 44. This rod, at its outer end, is provided with a foot piece 45 which may be engaged to depress the plunger and a spring 46 engaging between this foot piece and cap normally serves to hold the plunger in elevated position.

In installing the dirigible headlights and their controlling mechanism, it will be understood that the entire piping system and the lower chambers of all the control cylinders will be filled with any suitable fluid, such as an oil with a low freezing point or glycerin. Under these circumstances, it will be clear that depression of either of the plungers 35 and 41 will act to force the liquid along that pipe 19 with which its cylinder communicates and thus force the piston in such pipe which is connected to a light outwardly to turn the light. As soon as the force acting to depress the plunger is removed, the plunger will be raised by the back pressure of the liquid, due to the pressure exerted against the piston in the pipe 19 by the action of the spring upon the light tending to return the light and the light will then return back to original position.

Instead of using a liquid as the motive fluid, I may employ compressed air, in which case the piping of the system will, of necessity, differ somewhat and in which case hand and foot operated control valves will be substituted for the hand and foot operated plungers. Referring particularly to Figs. 9 to 11 of the drawings, such a compressed air operated system is shown. In this system, a pipe 47 leads from a compressed air reservoir 48 and is provided with branches 49 leading to hand operated valves 50 and with branches 51 leading to foot operated valves 52. Pipes 53 lead from the hand operated valves to the lights and correspond to the pipes 19 and pipes 54 lead from the foot operated valves to the pipes 53. It will, of course, be understood that the hand operated valves are located adjacent the steering wheel in the same manner as the hand operated plunger devices and that the foot operated valves are located in the same position as the foot operated plunger devices.

Each of the hand operated valves 50 includes a casing 55 having inlet and outlet ports 56 and 57, preferably disposed in alinement with each other and passing through threaded nipples by means of which the pipes 48 and 53 are connected. Rotatably mounted in the casing is the valve 58 which is of the turn plug type and provided with a diametric passage 59 which, in one position of the valve, establishes communication between the pipes 48 and 53. This valve plug is also formed with a passage 60 which communicates with the intermediate portion of the passage 59 and which, in one position of the valve, also communicates with the outlet pipe 53. In this latter position of the valve, one end of the passage 59 also alines with a vent port 61 formed in the valve casing. It will, therefore, be seen that by turning the valve to bring its passage 59 into alinement with the inlet and outlet ports, air may be permitted to pass from the reservoir into one of the pipes 53 to swing the light with which such pipe coöperates and that upon turning of the valve to the position shown in Fig. 10, supply of air to the pipe 53 will be cut off and the air in such pipe vented to the atmosphere. At the same time, by swinging the valve a little farther to closed position, supply of air through the pipe 53 will still be cut off and at the same time the communication between this pipe 53 and the atmosphere will be shut off. This is necessary as it would otherwise be impossible to operate a light by the foot controlled valve as air admitted to the pipe 53 would vent through the hand controlled valve.

Each of the foot operated control valves includes a cylinder 62 having an integral closure at one end and a removable cap 63 at its other. This cylinder is formed at diametrically opposite points with inlet and outlet ports 64 and 65 passing through internally threaded nipples by means of which the pipes 51 and 54 are connected. Reciprocally mounted in the cylinder is the piston valve 66 which is formed with a diametric passage 67 which in lowered position of the valve establishes communication between the ports in the valve casing. This valve is also provided with a second passage 68 which in almost fully closed position of the valve establishes communication between the pipe 54 and a vent port 69 formed in the valve casing, this communication being cut off when the valve is fully closed. The valve is provided with a valve stem 70 which projects through the cap 63 and carries a foot piece 71. A collar 72, secured to the valve stem, serves as an abutment for a spring 73 which normally holds the valve in raised position. This collar is formed with a vertical arm 74 having a plurality of spaced notches 75 which coöperate with a spring 76 secured to the casing and which serves as a means for indicating the position of the valve.

With this form of my invention, when either light is to be turned outwardly, air is supplied to its pipe 53 either by opening the proper hand operated control valve or the proper foot operated control valve as happens to be more convenient. When the light is to be returned to its original position, the hand operated valve, if employed in actuating the light, is turned to such position as to vent the pipe 53 to the atmosphere and held in this position until the light returns to normal position, after which the valve is fully closed. In like manner, if the foot operated valve was employed in turning the light, it would be released until it had moved to partially closed position to vent the pipes 54 and 53 and then further released until the spring 73 had fully closed it.

In Fig. 6 I have illustrated a slight modification of my invention in which the pipe 77, corresponding to the pipe 19, has its free end bent into substantially semi-circular configuration and in which the piston heads 78 are connected by an arcuate link 79 in such a manner that the piston may work in the semi-circular portion of the pipe. A correspondingly curved link 80 connects the outermost piston head with the light 14, as previously described. By this arrangement, it is possible to avoid slotting of the pipe as is the case with the form of invention shown in Fig. 4.

Obviously, many changes in the details of construction and arrangement of parts may be made without in the slightest degree departing from the spirit of my invention and I do not, therefore, wish to limit myself to the specific details illustrated and described but reserve the right to make any changes within the scope of the appended claims.

Having thus described the invention, what is claimed as new is:

1. A dirigible headlight for vehicles including a light supported for turning movement, means for limiting the amount of its movement in either direction, means normally holding it in one position, and manually controlled fluid pressure means for moving it to its other position, said latter means including a pipe extending into proximity to the light, a piston movable in the pipe toward the extended end thereof under fluid pressure in the pipe, and a link pivotally connecting the piston and light.

2. A dirigible headlight for vehicles including a light mounted for limited turning movement about a vertical axis, whereby it may be swung to direct its rays ahead of the vehicle or to the side thereof, means normally holding the light in the first of such positions, a pipe projecting at one end to a point adjacent the light and at its other end to a point adjacent the driver's seat, a piston in the former end of the pipe, connecting means between the piston and light, whereby reciprocation of the piston will turn the light, a cylinder closing the opposite end of the pipe, and a plunger closely fitted in the cylinder, the pipe and cylinder below the plunger being filled with a relatively non-compressible fluid, whereby depression of the plunger will transmit force through the fluid to move the piston.

3. A dirigible headlight system for vehicles including a pair of headlights adapted to be mounted for swinging movement, pipes disposed each with one end adjacent one of the lights, pistons in the pipes, operative connection between the pistons and lights, the opposite ends of the pipes being forked and each fork being closed by a cylinder, a hand operated plunger operating in one cylinder of each fork, and a foot operated plunger mounted in the other cylinder of each fork, the pipes and cylinders below the plungers being filled with a liquid, whereby depression of any plunger will act through the fluid in its pipe system to operate a piston and correlated light.

4. A dirigible headlight for vehicles including a light mounted for limited turning movement about a vertical axis whereby it may be swung to direct its rays ahead of the vehicle or to the side thereof, means normally holding the light in the first of said positions, a pipe projecting at one end to a point adjacent the light and at its other end to a point adjacent the driver's seat, a piston in the former end of the pipe, operative connection between the piston and light, a cylinder closing the opposite end of the pipe and provided with an inwardly directed abutment, a plunger fitting closely within the cylinder and having a helical groove to receive the abutment whereby turning of the plunger will cause its reciprocation in the cylinder, and means for manually turning the plunger whereby when the cylinder below the plunger and the pipe is filled with a relatively non-compressible fluid the movement of the plunger will be transmitted to the piston.

5. A dirigible headlight for vehicles including a light mounted for turning movement, a pipe projecting at one end to a point adjacent the driver's seat, a piston in the other end of the pipe, operative connection between the piston and light, a cylinder closing the opposite end of the pipe, and a manually operable plunger in the cylinder whereby when the cylinder below the plunger and the pipe are filled with a relatively non-compressible fluid movement may be transmitted from the plunger to the piston.

6. A dirigible headlight for vehicles including a light mounted for turning movement, a pipe projecting at one end to a point adjacent the light and having such end formed with a slot and at its opposite end to a point adjacent the driver's seat, a piston in the former end of the pipe, a link connecting the piston and light and movable in the slot upon the reciprocation of the piston to swing the light, a cylinder closing the opposite end of the pipe, and a plunger closely fitted in the cylinder whereby when the cylinder below the plunger and the pipe are filled with a relatively non-compressible fluid depression of the plunger will move the piston.

In testimony whereof I affix my signature.

HARRY F. HOFFMAN. [L. S.]

Copies of this patent may be obtained for five cents each, by addressing the "Commissioner of Patents, Washington, D. C."